(12) United States Patent
Height et al.

(10) Patent No.: US 6,935,190 B1
(45) Date of Patent: Aug. 30, 2005

(54) FLOW RATE MEASUREMENT APPARATUS

(75) Inventors: Murray J. Height, Somerville, MA (US); Eun Young Hwang, Cambridge, MA (US); Timothy J. Prestero, Jamaica Plain, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/408,398

(22) Filed: Apr. 7, 2003

Related U.S. Application Data

(60) Provisional application No. 60/374,661, filed on Apr. 23, 2002.

(51) Int. Cl.$^7$ .................................................. G01F 1/22
(52) U.S. Cl. .................................................. 73/861.57
(58) Field of Search ................ 73/861.52–861.58, 73/861.64, 861.67, 204.21; 604/246, 81

(56) References Cited

U.S. PATENT DOCUMENTS

| | | | | |
|---|---|---|---|---|
| 2,778,223 A | * | 1/1957 | Kimbrell ................. | 73/861.55 |
| 3,034,504 A | * | 5/1962 | Winsor et al. ........... | 73/861.55 |
| 3,049,918 A | * | 8/1962 | Sparkuhl ................. | 73/861.55 |
| 3,587,313 A | * | 6/1971 | Smith ..................... | 73/861.55 |
| 3,800,794 A | | 4/1974 | Georgi | |
| 3,803,914 A | * | 4/1974 | Noiles .................... | 73/861.54 |
| 3,915,167 A | | 10/1975 | Waterman | |
| 4,037,598 A | | 7/1977 | Georgi | |
| 4,238,108 A | | 12/1980 | Muetterties | |
| 4,270,725 A | | 6/1981 | Scott et al. | |
| 4,338,932 A | | 7/1982 | Georgi et al. | |
| 4,452,273 A | | 6/1984 | Hanzawa et al. | |
| 4,457,750 A | | 7/1984 | Hill | |
| 4,523,480 A | | 6/1985 | Inoue | |
| D280,763 S | | 9/1985 | Kulle | |
| 4,585,442 A | | 4/1986 | Mannes | |
| 4,662,599 A | | 5/1987 | Attermeier | |
| 4,699,617 A | * | 10/1987 | Moriuchi et al. ........ | 73/861.57 |
| 4,807,660 A | | 2/1989 | Aslanian | |
| 4,919,389 A | | 4/1990 | Hoekwater et al. | |
| 4,974,811 A | | 12/1990 | Ishida | |
| 5,186,058 A | * | 2/1993 | Lew ........................ | 73/861.56 |
| 5,193,400 A | | 3/1993 | Lew | |
| 5,259,587 A | | 11/1993 | D'Alessio et al. | |
| 5,373,746 A | * | 12/1994 | Bloss ...................... | 73/861.55 |
| 5,575,779 A | * | 11/1996 | Barry ...................... | 604/246 |
| 5,820,715 A | * | 10/1998 | Singleterry et al. ..... | 73/861.57 |
| 6,129,330 A | | 10/2000 | Guala | |
| 6,212,957 B1 | * | 4/2001 | McCombs et al. ...... | 73/861.55 |
| D457,083 S | | 5/2002 | Christiansen | |

* cited by examiner

*Primary Examiner*—Edward Lefkowitz
*Assistant Examiner*—T Miller
(74) *Attorney, Agent, or Firm*—Daly, Crowley, Mofford & Durkee, LLP

(57) ABSTRACT

An apparatus for flow rate measurement includes a body having a chamber with an inlet and an outlet and a structure, buoyant in the presence of a fluid, disposed in the chamber. The structure moves to a position in the chamber in proportion to a flow rate of the fluid flowing from the inlet to the outlet.

11 Claims, 4 Drawing Sheets

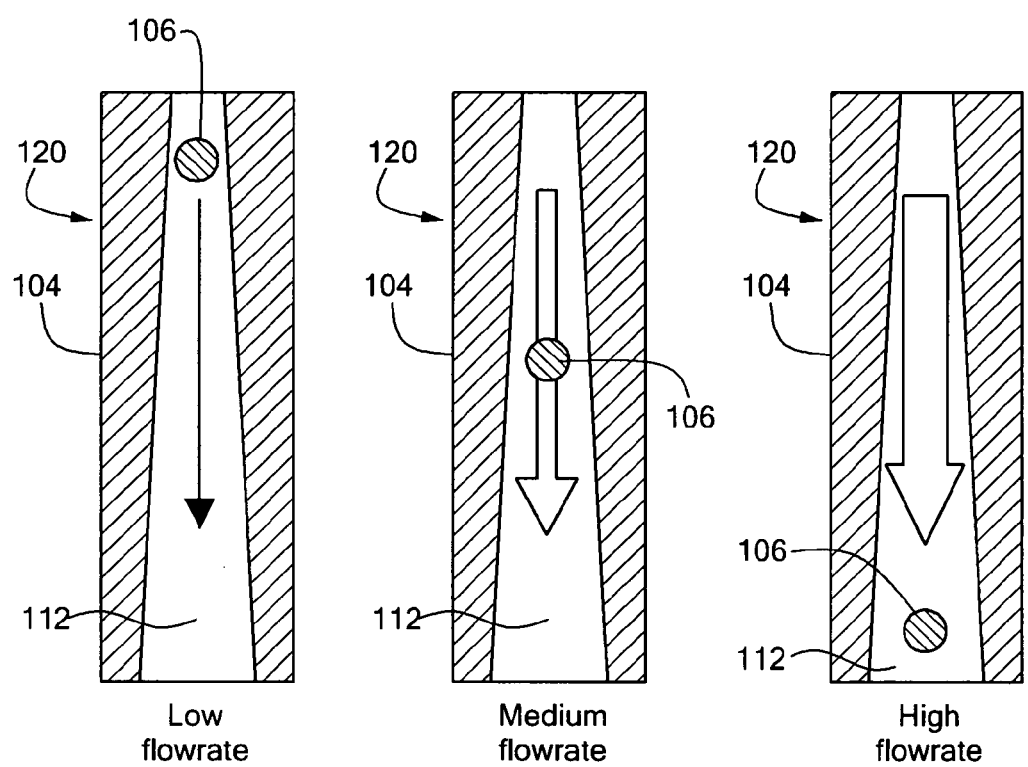
*FIG. 4*  *FIG. 4A*  *FIG. 4B*

FLOW RATE MEASUREMENT APPARATUS

CROSS REFERENCE TO RELATED APPLICATIONS

The present application claims the benefit under 35 U.S.C. §119(e) of U.S. Provisional Patent Application No. 60/374,661, filed on Apr. 23, 2002, which is incorporated herein by reference.

STATEMENT REGARDING FEDERALLY SPONSORED RESEARCH

Not Applicable.

FIELD OF THE INVENTION

This invention relates generally to flow rate measurement devices and more particularly to devices that measure the flow rate of a fluid.

BACKGROUND OF THE INVENTION

As is known in the art, there are certain medical conditions which, if not treated, can lead to severe dehydration and death. Cholera is one example of such a medical condition. To treat cholera and other conditions, an intravenous (IV) drip infusion is often used to re-hydrate patients and/or to introduce medicine into a patient's body. An intravenous drip infusion of saline is the preferred technique for the medical treatment of severe cholera. In a cholera epidemic, where many patients need to be treated as quickly as possible, it is desirable set up IV equipment and initiate treatment as rapidly as possible.

As is also known in the art, a conventional IV drip set includes a fluid reservoir, a clear plastic drip chamber coupled to the fluid reservoir for visualization of fluid flow, a clear flexible tube coupled to the drip chamber, a roller clamp coupled to the flexible tube for flow rate control, and an attachment to connect the flexible tube to an intravenous catheter adapted to be placed into a patient. The roller clamp provides an adjustable force upon the flexible tube and therefore an adjustable flow restriction. The rate at which fluid flows through the tube is estimated by observing the drip rate in the drip chamber. The rate at which the fluid flows through the tube is adjusted by adjusting the roller clamp until the desired drip rate is achieved. Such conventional IV drip sets are simple, relatively inexpensive and find widespread use. One example of a conventional IV drip set is further described in conjunction with FIG. 1 below.

When using the IV drip set, it is important for the user to accurately regulate the flow of fluid (e.g. saline solution) into the patient. The roller clamp is used to adjust the flow rate of the fluid flowing through the flexible tube and therefore the flow rate into the catheter, which is inserted into the patient's body. A user turns an adjustment roller on the roller clamp to provide more or less force, or clamping action, upon the flexible tube and therefore more or less restriction of the flexible tube, thereby adjustably controlling the flow rate.

It is relatively difficult for a user to accurately adjust conventional roller clamps to accurately provide a specific flow rate. Thus, to arrive at a specific flow rate, it is often necessary to make an adjustment, observe the resultant flow rate via the drip chamber, and then re-adjust as necessary. These steps are repeated until arriving at a desired specific flow rate. Flow rate adjustment can, therefore, be a relatively time-consuming task.

The difficulty in adjusting the flow rate is due in part to a large non-linearity in flow rate control provided by conventional roller clamps. Essentially, as the user turns the adjustment roller of the conventional roller clamp, the flow rate is not linearly adjusted in proportion to the rotation of the adjustment roller. The non-linearity is sufficiently great that even a slight rotation of the adjustment roller in either direction can cause an undesired flow rate either higher or lower than the desired flow rate. Furthermore, with each adjustment of the adjustment roller, the drip rate in the drip chamber must be observed to determine the flow rate. Observation of the drip rate involves counting a number of drips over a time period, for example, 15 seconds. As described above, particularly in epidemic situations, it is necessary that set up of the IV drip set, including adjustment of the flow rate, be done quickly. Difficulty of flow rate adjustment slows the set up process.

Therefore, it would be desirable to provide a flow rate measurement apparatus that quickly indicates the flow rate of the IV drip set, without counting drips of a period of time.

SUMMARY OF THE INVENTION

In accordance with the present invention, an apparatus for measuring a flow rate of a fluid includes a body having an inlet and an outlet, and further including a chamber disposed between the inlet and the outlet. A structure is disposed in the chamber. The structure has buoyancy in the presence of a fluid in the chamber. The structure moves to a position in response to a flow rate of the fluid flowing through the chamber.

With this particular arrangement, the apparatus for flow rate measurement provides a user with the ability to rapidly measure the flow rate of the fluid.

BRIEF DESCRIPTION OF THE DRAWINGS

The foregoing features of the invention, as well as the invention itself may be more fully understood from the following detailed description of the drawings, in which:

FIG. 4 is a cross-sectional view of a portion of an exemplary flow rate measurement apparatus shown at low flow rate;

FIG. 4A is a cross-sectional view of a portion of an exemplary flow rate measurement apparatus shown at medium flow rate; and FIG. 4B is a cross-sectional view of a portion of an exemplary flow rate measurement apparatus shown at high flow rate.

DETAILED DESCRIPTION OF THE INVENTION

Figure 1:
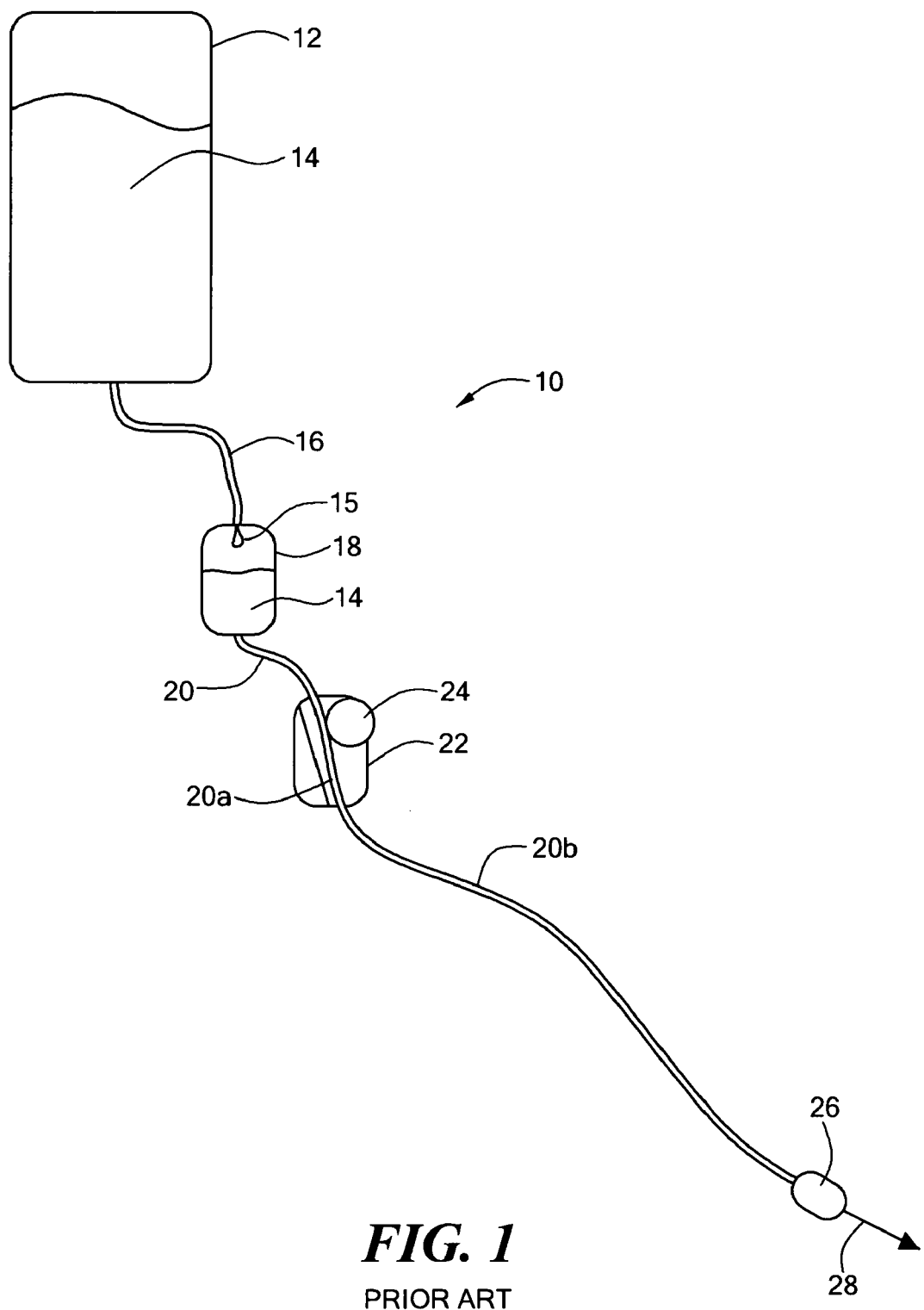
FIG. 1 is a view of a prior art intravenous (IV) drip set.

Referring now to FIG. 1, a prior art intravenous (IV) drip set 10 includes a fluid reservoir 12 containing a fluid 14. The fluid reservoir 12 can be provided, for example, as a conventional fluid bag (e.g., saline or blood) or as any type of other fluid container. The IV drip set 10 also includes a drip chamber 18 coupled to the fluid reservoir 12 with a tube 16. The drip chamber 18 allows a user to view the flow rate of the fluid 14 flowing in the tube 16 by viewing a drip rate of falling drops 15. The fluid 14 flows out of the drip chamber 18 and into a tube 20 having tube portions 20a and 20b. The tube 20 can be one of a variety of compressible tubes. For example, in one particular embodiment, the tube 20 is a flexible plastic tube. A roller clamp 22 having an adjustment roller 24 is coupled to the tube portion 20a. The tube portion 20b is coupled with an attachment 26 to a catheter 28, which is inserted into a patient (or an animal).

The prior art roller clamp 22 is known to provide flow rate control. Suffice it here to say that, in operation, the roller clamp 22 provides a variable force, and therefore, a variable compression, upon the tube portion 20a, in proportion to manual rotation of the adjustment roller 24 by a user. The variable compression provides a selectable restriction of the tube portion 20b. Therefore, by observing the rate of drops 15 falling in the drip chamber 18, and turning the adjustment roller 24 in order to select a drip rate, a user selects a flow rate of the fluid 14 flowing through the tube 20 and into the arm of the patient.

Figure 2:
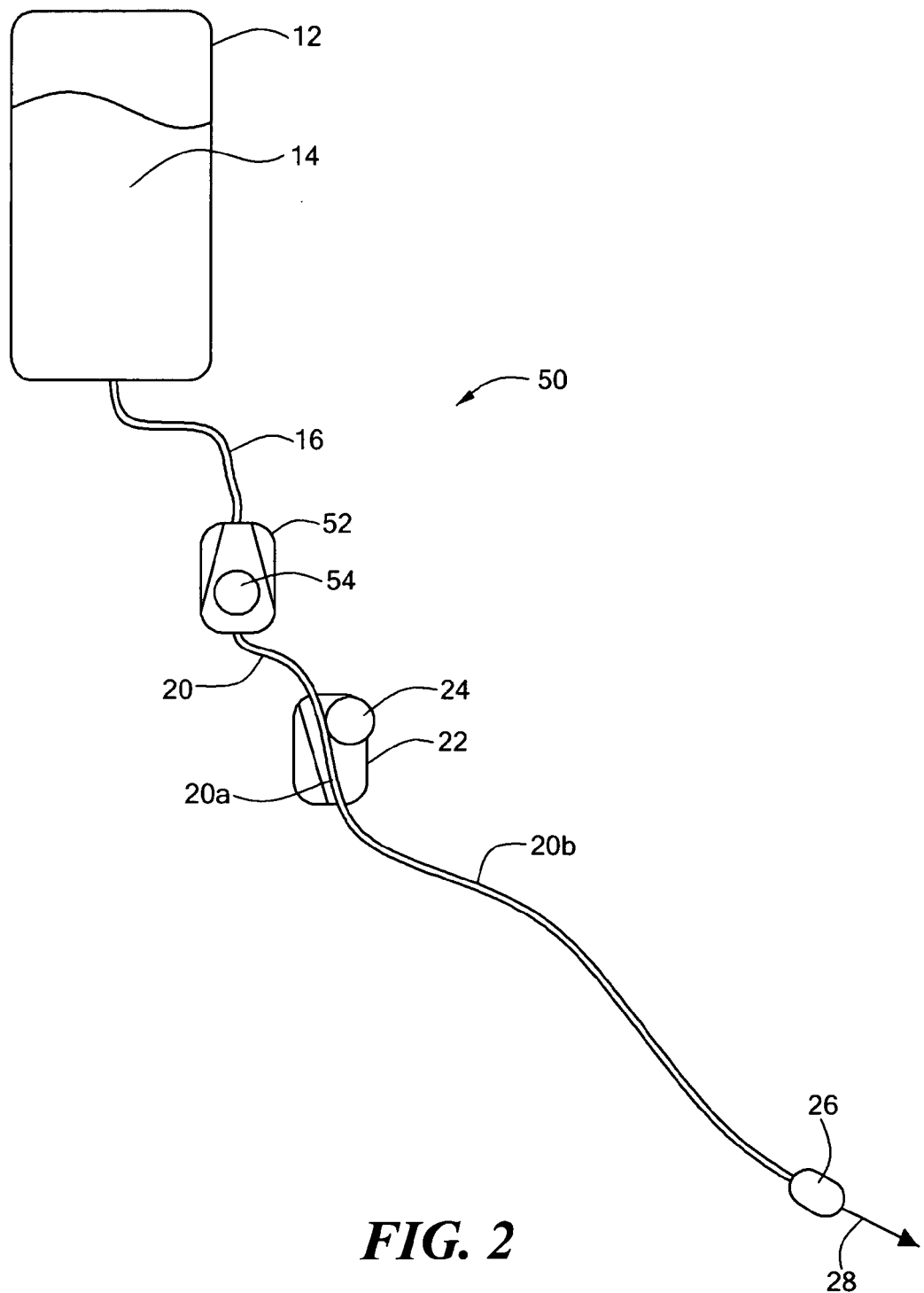
FIG. 2 is a view of an IV drip set having a flow rate measurement apparatus in accordance with the present invention.

Referring now to FIG. 2, in which like elements of FIG. 1 are shown having like reference designations, an IV drip set 50 includes a flow rate measurement apparatus 52 in accordance with the present invention. The flow rate measurement apparatus 52 can be used in place of a drip chamber such as drip chamber 18 (FIG. 1). The flow rate measurement apparatus 52 includes a structure 54, the position of which indicates a flow rate of the fluid 14 flowing through the tube 16.

Figure 3:
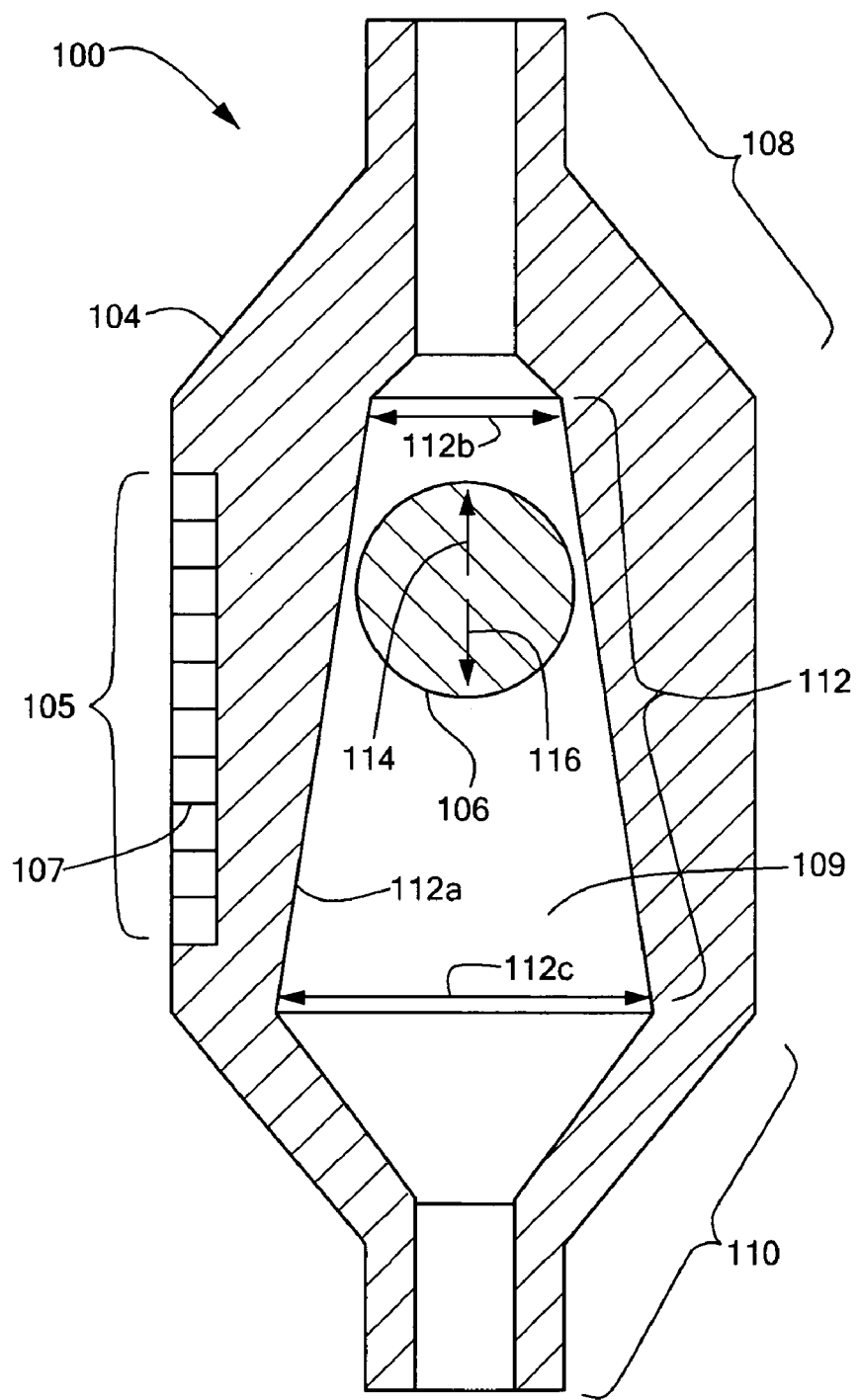
FIG. 3 is a cross-sectional view of an exemplary flow rate measurement apparatus in accordance with the present invention.

Referring now to FIG. 3, an exemplary flow rate measurement apparatus 100 includes a body 304 and a structure 106. The body 104 has a chamber 112 with tapered inner surface 112a having a smallest dimension 112b associated with an inlet 108 and a largest dimension 112c associated with an outlet 110. The structure 106 has a dimension smaller than the largest dimension 112c. For example, if structure 106 is provided having a spherical shape, then the diameter of the sphere should be smaller than dimension 112c. It should, of course, be appreciated that 106 may be provided having any shape which is suitable for operation of the apparatus 100 as described below. It should also be appreciated that chamber 112 and inner surface may also be provided having any shape that is suitable for operation of the devices.

A scale 105 having graduations, of which graduation 107 is but one example, can be disposed on the body 104. The scale 105 can be adhered to the side of the body 104 with adhesive or the like, or, in an alternate embodiment, the scale 105 can be molded into the body 104.

A fluid 109, which can be a liquid, a gas, or a mixed phase combination of any of a liquid, a gas, and solids, is disposed into the chamber 112. The fluid 109 has a density higher than the density of the structure 106, which tends to make the structure 106 rise in the direction of the inlet 108. The structure 106 has buoyancy in the presence of the fluid 109, generating a buoyancy force 114. When the fluid 109 flows through the chamber 112 in a direction toward the outlet 110, a fluid drag force 116 tends to make the structure 106 move in the direction of the outlet 110. The structure 106 moves to a position at which the buoyancy force 114 and the fluid drag force 116 reach an equilibrium.

Because the chamber 112 is tapered, the fluid 109 in the chamber 112 flows faster in the vicinity of the smallest dimension 112b and flows slower in the vicinity of the largest dimension 112c. Therefore, because the chamber 112 is tapered, the position of the structure 106 at which the buoyancy force 114 and the fluid drag force 116 reach equilibrium is proportional to the rate of fluid flowing through the chamber 112. The position of the structure 106 within the chamber 112 is associated with a pre-determined relationship that includes, but is not limited to, a cross sectional area of the structure 106, a cross sectional area of an annular ring bounded by the structure 106 and the chamber 112, a volume of the structure 106, a density of the structure 106, a density of the fluid 109, and a flow rate of the fluid 109. The above-listed, as well as other characteristics effects the position of the structure 106 within the chamber 112. The characteristics are selected in accordance with, a variety of factors, including but not limited to, a desired range of flow rates to be measured and a desired size of the flow rate measurement apparatus.

In operation, by observing the position of the structure 106, a user can determine the flow rate of the fluid flowing through the chamber 112 from the inlet 108 to the outlet 110. The scale 105 can facilitate observation of the position of the structure. In one embodiment, the scale 105 can have indications in volume per time to indicate flow rate.

In one particular embodiment, the chamber 112 has a substantially conical shape. In another embodiment, the chamber has a substantially pyramidal shape. However, in other embodiments, the chamber 112 can have other shapes, including irregular shapes.

In one particular embodiment, the structure 106 is a ball having a round shape. In another embodiment, the structure 106 has an ovular shape. However, in other embodiments, the structure 106 can have other shapes, including irregular shapes.

In one particular embodiment, the body 104 is substantially clear so that the position of the structure 106 can be readily seen. In another embodiment, the body 104 is substantially opaque and a portion (not shown) of the body 104 can be substantially clear.

The inlet 108 can be coupled to a tube (not shown), for example, the tube 16 of FIG. 2. The outlet 110 can also be coupled to a tube (not shown), for example, the tube 20 of FIG. 2.

Referring now to FIG. 4, in which like elements of FIG. 3 are shown having like reference designations, a portion 120 of an exemplary flow rate measurement apparatus includes the body 104 and the structure 106. The structure 106 moves to a first position in the presence of a fluid, having a low flow rate, flowing through the chamber 112.

Referring now to FIG. 4A, in which like elements of FIG. 3 are shown having like reference designations, the portion 120 of the exemplary flow rate measurement apparatus shown in FIG. 4 includes the body 104 and the structure 106. The structure 106 moves to a second position in the presence of a fluid, having a medium flow rate, flowing through the chamber 112.

Referring now to FIG. 4B, in which like elements of FIG. 3 are shown having like reference designations, the portion 120 of the exemplary flow rate measurement apparatus shown in FIG. 4 includes the body 104 and the structure 106. The structure 106 moves to a third position in the presence of a fluid, having a high flow rate, flowing through the chamber 112.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. An apparatus to measure a flow rate of a fluid, the apparatus comprising:
   a body having in an inlet adapted to couple to an inlet tube and an outlet adapted to couple to an outlet tube, said body having a chamber in fluid communication with the inlet and the outlet, the chamber having a smallest dimension and a largest dimension; and
   a structure disposed within the chamber, said structure having a largest dimension which is smaller than the largest dimension of the chamber, wherein the structure has a positive buoyancy in the presence of the fluid, such that the structure has a tendency to move upward in the fluid when the fluid is stationary, and wherein a flow of the fluid in the apparatus is in a continuous top-to-bottom direction.

2. The apparatus of claim 1, wherein in response to a flow rate of the fluid flowing from te inlet to the outlet, said structure moves to a position within the chamber indicative of the flow rate of the fluid.

3. The apparatus of claim 1, wherein the chamber is provided having a substantially conical shape, the inlet is disposed substantially at an apex of the conical chamber and the outlet is disposed substantially at a base of the conical chamber.

4. The apparatus of claim 1, wherein the fluid includes a liquid.

5. The apparatus of claim 1, wherein the fluid includes a gas.

6. The apparatus of claim 1, wherein the fluid includes suspended solids.

7. The apparatus of claim 1, further including a linear scale disposed on the body to indicate the flow rate of the fluid.

8. The apparatus of claim 7, wherein the scale is adhesively coupled to the body.

9. The apparatus of claim 1, wherein the body has a cylindrical outer surface.

10. The apparatus of claim 1, wherein the fluid is used in an intravenous drip set.

11. The apparatus of claim 1, wherein the position of said structure is associated with a pre-determined relationship including a cross sectional area of said structure, a cross sectional area of an annular ring bounded by said structure and the chamber, a volume of said structure, a density of said structure, a density of the fluid, and a flow rate of the fluid.

* * * * *

UNITED STATES PATENT AND TRADEMARK OFFICE
CERTIFICATE OF CORRECTION

PATENT NO. : 6,935,190 B1
DATED : August 30, 2005
INVENTOR(S) : Murray J. Height et al.

It is certified that error appears in the above-identified patent and that said Letters Patent is hereby corrected as shown below:

Column 1,
Line 32, "desirable set up" and replace with -- desirable to set up --.

Column 3,
Line 31, delete "body 304" and replace with -- body 104 --.
Line 39, delete "that 106" and replace with -- that structure 106 --.

Column 4,
Line 12, delete "with, a variety" and replace with -- with a variety --.

Column 5,
Line 21, delete "from te" and replace with -- from the --.

Signed and Sealed this

Fourteenth Day of March, 2006

JON W. DUDAS
*Director of the United States Patent and Trademark Office*